US010438334B2

(12) United States Patent
Yi et al.

(10) Patent No.: US 10,438,334 B2
(45) Date of Patent: Oct. 8, 2019

(54) THREE DIMENSIONAL IMAGE FUSION METHOD AND DEVICE AND NON-TRANSITORY COMPUTER-READABLE MEDIUM

(71) Applicants: Hong Yi, Beijing (CN); Weitao Gong, Beijing (CN); Haihua Yu, Beijing (CN); Wei Wang, Beijing (CN)

(72) Inventors: Hong Yi, Beijing (CN); Weitao Gong, Beijing (CN); Haihua Yu, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 180 days.

(21) Appl. No.: 15/848,692

(22) Filed: Dec. 20, 2017

(65) Prior Publication Data

US 2018/0240223 A1  Aug. 23, 2018

(30) Foreign Application Priority Data

Feb. 23, 2017  (CN) .......................... 2017 1 0099062

(51) Int. Cl.
*G06T 5/00* (2006.01)
*G06T 5/50* (2006.01)
(Continued)

(52) U.S. Cl.
CPC ................. *G06T 5/50* (2013.01); *G06T 3/00* (2013.01); *G06T 7/30* (2017.01); *G06T 7/33* (2017.01);
(Continued)

(58) Field of Classification Search
CPC .... G06T 5/50; G06T 7/30; G06T 7/33; G06T 3/00; G06T 15/20; G06T 2207/20221
See application file for complete search history.

(56) References Cited

U.S. PATENT DOCUMENTS 10,136,055 B2 * 11/2018 Lei .......................... G02B 13/06
2010/0033551 A1 * 2/2010 Agarwala ............. G06T 3/0018
348/36

(Continued)

OTHER PUBLICATIONS

"Image fusion" Wikipedia, the free encyclopedia, last edited on Sep. 13, 2017 <URL> https://en.wikipedia.org/wiki/Image_fusion.
(Continued)

*Primary Examiner* — Ping Y Hsieh
(74) *Attorney, Agent, or Firm* — IPUSA, PLLC (57) ABSTRACT

Three dimensional image fusion method and device are disclosed. The method includes steps of obtaining a spherical image and a two dimensional image; projecting the two dimensional image onto a planar surface predetermined in a spherical coordinate system where the spherical image is located, so as to acquire a projected image having a predetermined number of feature points on the spherical surface corresponding to the spherical image; determining multiple mapping points on the spherical surface which correspond to the predetermined number of feature points, letting the predetermined number of feature points superpose on the multiple mapping points, respectively, and carrying out spatial coordinate conversion, so as to attain a converted image; and mapping multiple points except the predetermined number of feature points in the converted image onto the spherical image based on a predetermined mapping relationship, so as to fuse the two dimensional image onto the spherical image.

12 Claims, 6 Drawing Sheets

(51) Int. Cl.
G06T 7/30 (2017.01)
G06T 7/33 (2017.01)
G06T 3/00 (2006.01)
G06T 15/20 (2011.01)

(52) U.S. Cl.
CPC .... G06T 15/20 (2013.01); *G06T 2207/20221* (2013.01)

(56) References Cited

U.S. PATENT DOCUMENTS

2018/0144488 A1* 5/2018 Kim .................. G06T 7/30
2018/0268517 A1* 9/2018 Coban ................ G06T 3/0087

OTHER PUBLICATIONS

"Homography (computer vision)" Wikipedia, the free encyclopedia, last edited on Oct. 6, 2017 <URL> https://en.wikipedia.org/wiki/Homography_(computer vision).

* cited by examiner

THREE DIMENSIONAL IMAGE FUSION METHOD AND DEVICE AND NON-TRANSITORY COMPUTER-READABLE MEDIUM

BACKGROUND OF THE DISCLOSURE

1. Field of the Disclosure

The present disclosure relates to the field of image processing, and more particularly relates to a three dimensional image fusion method and device as well as a non-transitory computer-readable medium.

2. Description of the Related Art

Image fusion (for more information, see en.wikipedia.org/wiki/Image_fusion) considers how to seamlessly combine one or more regions of interest in an image(s) into a target image. So far, a lot of research has been done in terms of two dimensional image fusion. These kinds of research mainly focus on eliminating the color differences on the fused boundaries in a fused two dimensional image and adjusting the color of the fused two dimensional image to match a target scene, so as to obtain a good image fusion result.

Compared to conventional two dimensional images, a three dimensional image or video may bring a more vivid visual experience to people. As a result, the generation and editing of a three dimensional image or video have become a very important research topic in recent years, which include the studies on three dimensional image fusion. However, in conventional techniques, when fusing a two dimensional image or video onto a three dimensional image such as a spherical image or the like, there are always discontinuous regions on the fused boundaries in the fused three dimensional image, so that it is impossible to acquire a satisfied image fusion result.

SUMMARY OF THE DISCLOSURE

In order to solve the above-described technical problem, the present disclosure provides a three dimensional image fusion method and device.

According to a first aspect of the present disclosure, a three dimensional image fusion method is provided which includes steps of obtaining a spherical image and a two dimensional image to be fused onto the spherical image; projecting the two dimensional image onto a planar surface predetermined in a spherical coordinate system where the spherical image is located, so as to acquire a projected image which has a predetermined number of feature points on a spherical surface corresponding to the spherical image; determining multiple mapping points on the spherical surface which correspond to the predetermined number of feature points, letting the predetermined number of feature points superpose on the multiple mapping points, respectively, and carrying out spatial coordinate conversion, so as to attain a converted image; and mapping multiple points except the predetermined number of feature points in the converted image onto the spherical image based on a predetermined mapping relationship so as to fuse the two dimensional image onto the spherical image, so that a fused spherical image is procured.

According to a second aspect of the present disclosure, a three dimensional image fusion device is provided which includes an image obtaining part configured to obtain a spherical image and a two dimensional image to be fused onto the spherical image; an image projection part configured to project the two dimensional image onto a planar surface predetermined in a spherical coordinate system where the spherical image is located, so as to acquire a projected image which has a predetermined number of feature points on a spherical surface corresponding to the spherical image; a coordinate conversion part configured to determine multiple mapping points on the spherical surface which correspond to the predetermined number of feature points, let the predetermined number of feature points superpose on the multiple mapping points, respectively, and carrying out spatial coordinate conversion, so as to attain a converted image; and an image fusion part configured to map multiple points except the predetermined number of feature points in the converted image onto the spherical image based on a predetermined mapping relationship so as to fuse the two dimensional image onto the spherical image, so that a fused spherical image is procured.

According to a third aspect of the present disclosure, another three dimensional image fusion device is provided which includes a processor; and a storage connected to the processor, storing computer-executable instructions for execution by the processor. The computer-executable instructions, when executed, cause the processor to implement the three dimensional image fusion method described above.

According to a fourth aspect of the present disclosure, a non-transitory computer-readable medium is provided which stores computer-executable instructions for execution by a processing system. The computer-executable instructions, when executed, cause the processing system to carry out the three dimensional fusion method set forth above.

As a result, by utilizing the three dimensional image fusion method or the three dimensional image fusion devices, it is possible to seamlessly fuse a two dimensional image or video onto a spherical image, i.e., there are not any discontinuous regions or gaps on the fused boundaries in the fused spherical image, so that a satisfied image fusion result may be acquired. In addition, the process of this kind of image fusion is simple, and the practicality of this type of image fusion is strong.

DETAILED DESCRIPTION OF THE PREFERRED EMBODIMENTS

In order to let a person skilled in the art better understand the present disclosure, hereinafter, the embodiments of the present disclosure will be concretely described with reference to the drawings. However, it should be noted that the same symbols, which are in the specification and the drawings, stand for constructional elements having basically the same function and structure, and the repetition of the explanations to the constructional elements is omitted.

Figure 1:
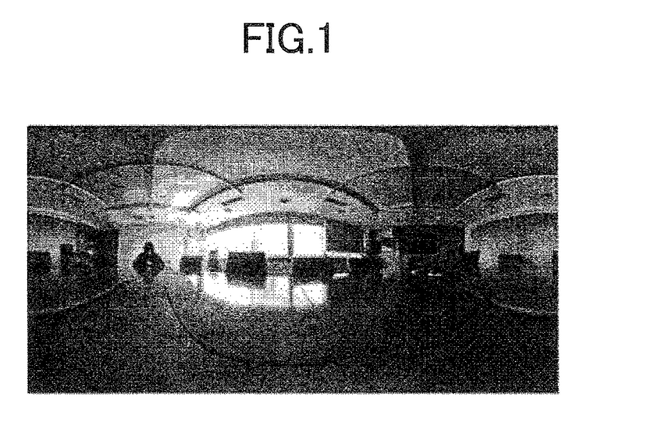
FIG. 1 illustrates an example of a planar image which is captured by a panoramic camera and used for attaining a spherical image.

FIG. 1 illustrates an example of a planar image (also called a "first planar image" hereinafter) which is captured by a panoramic camera and used for attaining a spherical image.

Generally speaking, when utilizing a panoramic camera, for example, a fisheye camera to acquire a spherical image, image distortion may occur in the relating first planar image as shown in FIG. 1 due to the imaging principle of the panoramic camera. In this case, if a predetermined two dimensional image or video is fused onto a location (e.g., a region of interest) in the relating first planar image by means of a conventional two dimensional image fusion approach, then there may exist discontinuous regions or gaps on the fused boundaries in the fused spherical image because of the image distortion occurred in the relating first planar image. As a result, it is impossible to achieve a seamless image fusion effect.

First Embodiment

In this embodiment, a three dimensional image fusion method is provided.

Figure 2:
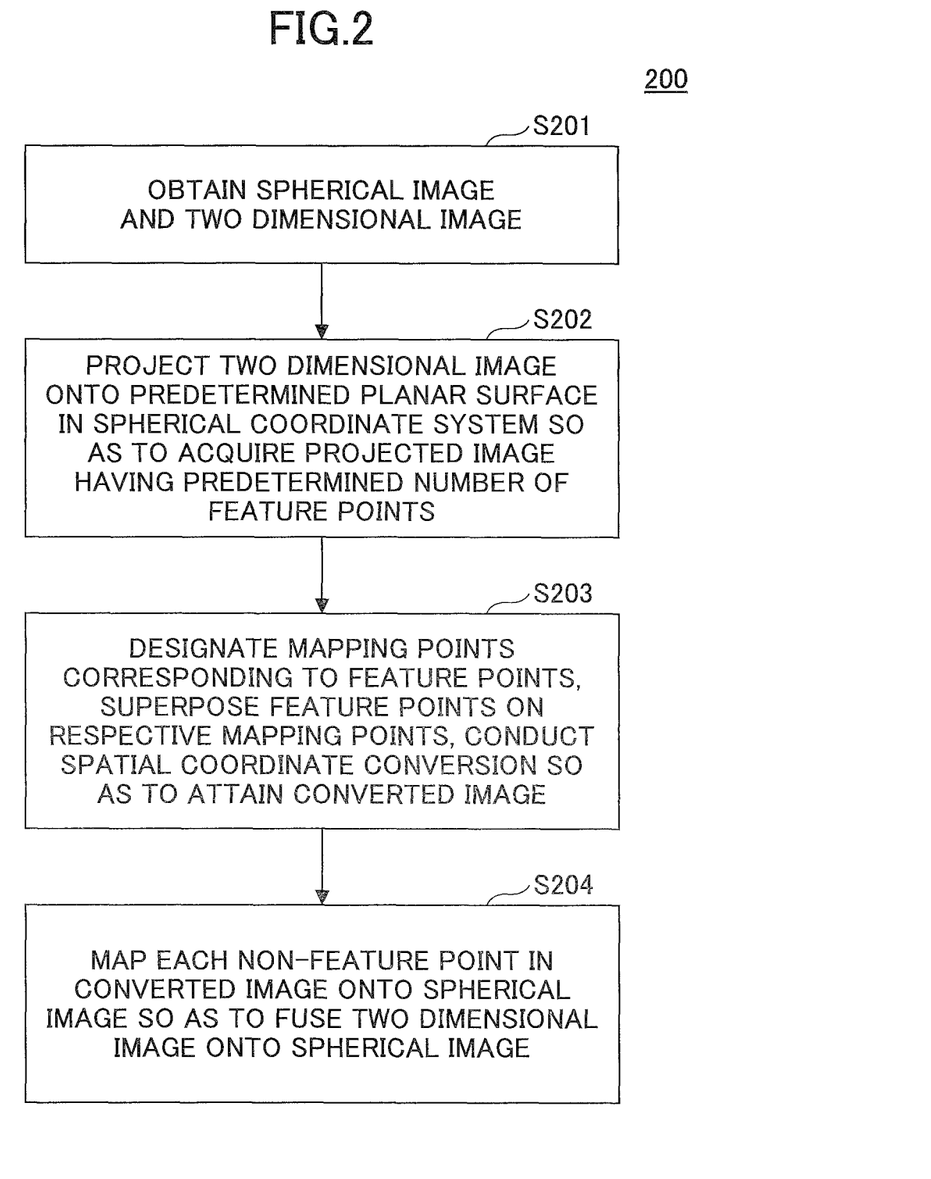
FIG. 2 is a flowchart of a three dimensional image fusion method according to a first embodiment of the present disclosure.

FIG. 2 is a flowchart of a three dimensional image fusion method according to this embodiment.

Here it should be noted that the three dimensional image fusion method may also apply to image fusion between a two dimensional video and a spherical image.

As shown in FIG. 2, the three dimensional image fusion method is inclusive of STEPS S201 to S204.

In STEP S201 of FIG. 2, a spherical image and a two dimensional image which will be fused onto the spherical image are obtained.

The spherical image may be acquired by a panoramic camera. In particular, first a first planar image, which is an equirectangular image, as presented in FIG. 1 is taken by the panoramic camera. Second longitude and latitude based mapping (projection) is performed on the first planar image so as to procure a spherical image. In this embodiment, the visual angle of the spherical image may be 360 degrees (i.e., the whole spherical surface) or 180 degrees (i.e., a hemispherical surface), and may also be 320 degrees, 270 degrees, etc.

The two dimensional image may have a polygonal shape. Preferably, the shape of the two dimensional image is a triangle, rectangle, square, or regular polygon.

In STEP S202 of FIG. 2, the two dimensional image is projected onto a planar surface (plane) predetermined in the spherical coordinate system where the spherical image is located, so as to obtain a projected image. The projected image has a predetermined number of feature points on the spherical surface corresponding to the spherical image.

Particularly, this step includes sub steps of acquiring a point on the spherical surface corresponding to the spherical image; attaining the bottom surface of a spherical segment, the distance between the bottom surface and the point on the spherical surface being a predetermined one; and projecting the two dimensional image onto the bottom surface of the spherical segment so as to obtain a projected image which is inscribed in the bottom surface (i.e., a circle) of the spherical segment.

In an example, it is possible to project, according to the size of the two dimensional image itself, the two dimensional image onto the bottom surface of the spherical segment, so that the projected image is inscribed in the bottom surface of the spherical segment. Of course, it is also possible to enlarge or reduce the two dimensional image, and project, in linear and equal proportion, the enlarged or reduced two dimensional image onto the bottom surface of the spherical segment, so that the projected image is inscribed in the bottom surface of the spherical segment. The predetermined number of feature points that the projected image has may be the intersections of the projected image and the bottom surface of the spherical segment, i.e., the corner points of the projected image which are on the spherical surface corresponding to the spherical image. Alternatively, the projected image may not be inscribed in the bottom surface of the spherical segment. In this case, it is possible to select a part of the edge points of the projected image, some points on a symmetric axis in the projected image, or a plurality of points on the boundaries of patterns in the projected image to serves as the predetermined number of feature points of the projected image.

In STEP S203 of FIG. 2, multiple mapping points on the spherical surface corresponding to the spherical image are designated which correspond to the predetermined number of feature points of the projected image. And then, the predetermined number of feature points are superposed on the corresponding mapping points, and spatial coordinate conversion is carried out, so that a converted image is attained.

In this step, the multiple mapping points on the spherical surface corresponding to the spherical image, corresponding to the predetermined number of feature points of the projected image may be determined in advance, or may also be chosen according to a predetermined rule. The positions of the multiple mapping points may be dependent on the location of a predetermined region of interest on the spherical image, onto which the two dimensional image will be projected, for example, the location of a display screen in the spherical image. After the positions of the multiple mapping points are designated, it is possible to create, on the basis of the positions of the predetermined number of feature points and the corresponding mapping points, a perspective transformation matrix, i.e., a homography matrix (for more information, see en.wikipedia.org/wiki/Homography_(computer_vision)), and acquire the converted image on the grounds of the projected image and the homography matrix. Here it should be noted that the predetermined number of feature points and the corresponding mapping points may be partly or entirely superimposed, or may also not be superimposed at all.

In particular, the predetermined number of feature points of the projected image may be dragged to the corresponding mapping points on the spherical surface corresponding to the spherical image so as to let each feature point superpose on the corresponding mapping point. In this process, it is possible to conduct triangular surface conversion with respect to the projected image (i.e., divide the projected image into multiple triangular surfaces), and create, on the basis of the multiple triangular surfaces, a homography matrix between time points before and after being dragged so as to obtain a mapping matrix between the projected image and the converted image, thereby generating a converted image.

In STEP S204 of FIG. 2, multiple points (also called "non-feature points" hereinafter) except the predetermined number of feature points in the converted image are mapped onto the spherical image according to a predetermined mapping relationship, so as to let the two dimensional image be fused on the spherical image.

As described above, in STEP S203 of FIG. 2, all the predetermined number of feature points on the converted image are located at the multiple mapping points on the spherical surface corresponding to the spherical image, respectively. That is, all the predetermined number of feature points in the converted image are on the spherical surface corresponding to the spherical image. The purpose of this step is to map the multiple non-feature points in the converted image onto the spherical image.

Particularly, first the intersections of the spherical surface corresponding to the spherical image and a straight line, which passes through the spherical center of the spherical surface and a non-feature point on the converted image, are acquired. In general, the number of the acquired intersections are two; as such, it is possible to determine, according to a region needing to be mapped or other configurations, one of the acquired intersections as an intersection for mapping. Second the non-feature point on the converted image is mapped onto the intersection for mapping, and the corresponding original point on the spherical image is replaced at the same time. After this kind of process is conducted with respect to all the non-feature points on the converted image, the two dimensional image is fused on the spherical image. In this way, it is possible to produce a new spherical image, i.e., a fused spherical image.

In an example, the three dimensional image fusion method may further include a step of carrying out longitude and latitude based mapping (projection) in regard to the fused spherical image so as to procure a second planar image which is also an equirectangular image.

Additionally, in a case where a user wants to change the location on the spherical image onto which the two dimensional image will be fused (e.g., the location of a display screen in the spherical image) on the basis of the above, it is possible to set multiple mapping points on the spherical surface corresponding to the spherical image again, acquire a new converted image, and map the new converted image onto the spherical image in the same way.

As a result, by taking advantage of the three dimensional image fusion method, it is possible to seamlessly fuse a two dimensional image onto a spherical image, i.e., there are not any discontinuous regions or gaps on the fused boundaries in the fused spherical image, so that a satisfied image fusion result may be acquired. In addition, the process of this kind of image fusion is simple, the practicality of this type of image fusion is strong, and the requirements of different visual angles and fusion locations can be met.

In what follows, an example is given for concretely describing the three dimensional image fusion method by referring to FIGS. 3 to 10.

Figure 3:
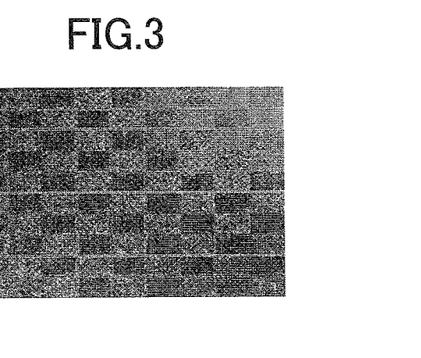
FIG. 3 illustrates a two dimensional image to be fused onto a spherical image.

FIG. 3 illustrates a two dimensional image to be fused onto the spherical image corresponding to the first planar image shown in FIG. 1.

As described above, the spherical image corresponding to the first planar image shown in FIG. 1 may be generated by carrying out longitude and latitude based mapping (projection) with respect to the first planar image.

Figure 4:
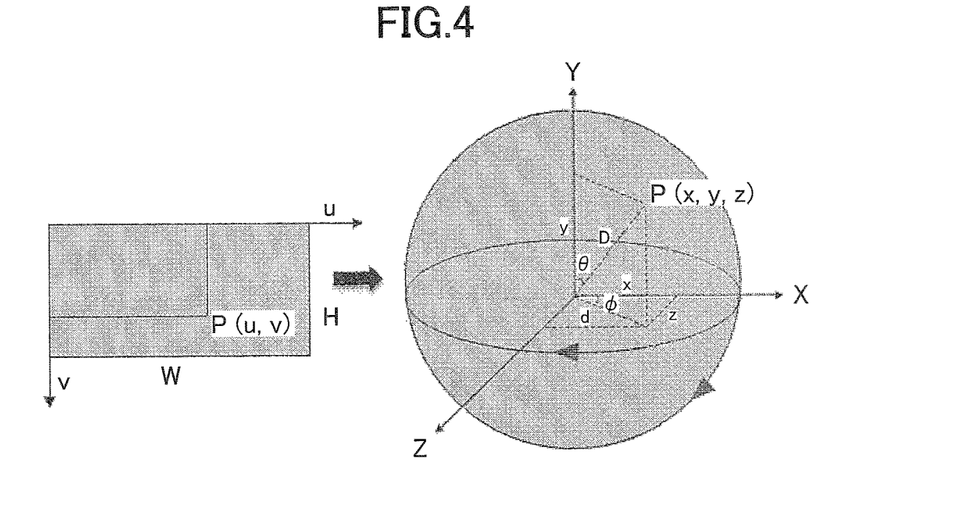
FIG. 4 illustrates a process of longitude and latitude based mapping (projection)

FIG. 4 illustrates a process of longitude and latitude based mapping (projection).

As presented in the left image (i.e., a first planar image) in FIG. 4, (u,v) refers to the coordinates of a pixel point P therein, and the width and height of the first planar image are W and H, respectively. After the first planar image is projected onto a spherical coordinate system $(r,\theta,\varphi)$, as shown in the right image in this drawing, the radius of the sphere acquired is R, and the spherical coordinates of the pixel point P after projection are (x,y,z). Here, $$\varphi = \frac{u}{W} \times 2\pi;$$

$$\theta = \frac{v}{H} \times 2\pi;$$

$$x = R \times \sin\theta \times \cos\varphi;$$

$$y = R \times \cos\theta; \text{ and}$$

$$z = R \times \sin\theta \times \sin\varphi.$$

Figure 5:
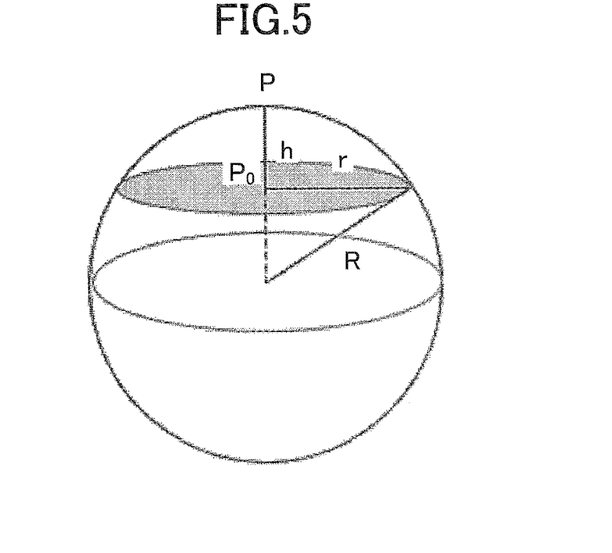
FIG. 5 illustrates a process of selecting the bottom surface of a spherical segment in a spherical coordinate system.

FIG. 5 illustrates a process of choosing the bottom surface of a spherical segment in the spherical coordinate system.

Figure 6:
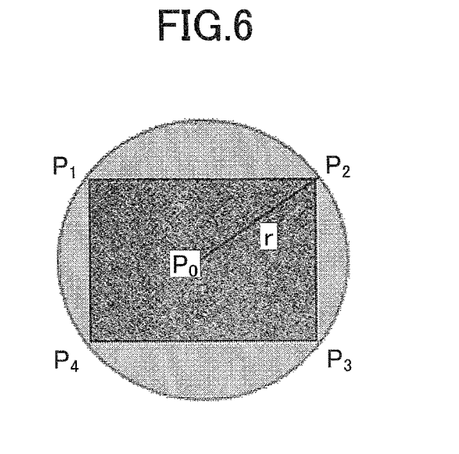
FIG. 6 illustrates a rectangle inscribed in the bottom surface of a spherical segment, onto which the two dimensional image shown in FIG. 3 is projected.

FIG. 6 illustrates a rectangle inscribed in the bottom surface of the spherical segment onto which the two dimensional image is projected.

As shown in FIG. 5, a point P(x,y,z) on the spherical surface corresponding to the spherical image is obtained in the spherical coordinate system, and then, the bottom surface of a spherical segment is selected whose radius is r and the distance between which and the point P(x,y,z) is h, so that the two dimensional image is projected, in linear and equal proportion, onto the bottom surface of the spherical segment so as to acquire a rectangle as a projected image inscribed therein whose center is $P_0(x_0,y_0,z_0)$, as shown in FIG. 6. Here, the four corner points $P_1(x_1,y_1,z_1)$, $P_2(x_2,y_2,z_2)$, $P_3(x_3,y_3,z_3)$, and $P_4(x_4,y_4,z_4)$ of the inscribed rectangle presented in FIG. 6 are the predetermined number of feature points of the projected image as depicted above.

Figure 7:
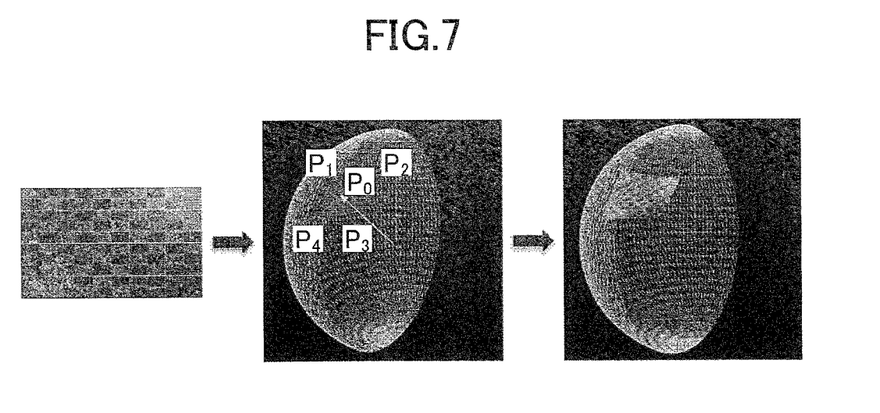
FIG. 7 illustrates a process of projecting the two dimensional shown in FIG. 3 onto the spherical coordinate system so as to obtain a projected image.

FIG. 7 illustrates a process of projecting the two dimensional image shown in FIG. 3 onto the spherical coordinate system.

If $P_1(x_1,y_1,z_1)$ shown in FIG. 6 is taken as an example, then $$\varphi = \tan^{-1}\frac{z}{x};$$

$$\theta = \tan^{-1}\left(\frac{\sqrt{x^2+z^2}}{y}\right);$$

$$x_0 = (R-h) \times \sin\theta \times \cos\varphi;$$

$$y_0 = (R-h) \times \cos\theta;$$

-continued $$z_0 = (R - h) \times \sin\theta \times \sin\varphi;$$

$$r = \sqrt{4h(2R-h)} = \sqrt{(x_1-x_0)^2 + (y_1-y_0)^2 + (z_1-z_0)^2}, \text{ and}$$

$$R = \sqrt{x_1^2 + y_1^2 + z_1^2}.$$

Of course, for each of $P_2(x_2,y_2,z_2)$, $P_3(x_3,y_3,z_3)$, and $P_4(x_4,y_4,z_4)$ presented in FIG. 6, it is the same.

Figure 8:
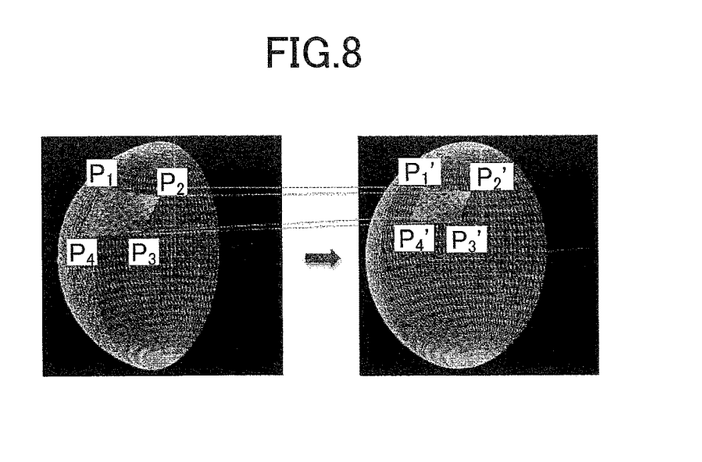
FIG. 8 illustrates a process of conducting spatial coordinate conversion with respect to the projected image presented in FIG. 7 so as to acquire a converted image.

FIG. 8 illustrates a process of conduct spatial coordinate conversion with respect to the projected image so as to acquire a converted image.

As presented in FIG. 8, it is possible to designate four mapping points $P_1'$, $P_2'$, $P_3'$, and $P_4'$ on the spherical surface corresponding to the spherical image, corresponding to the four feature points $P_1$, $P_2$, $P_3$, and $P_4$ of the projected image on the grounds of a predetermined location in the spherical surface onto which the two dimensional image needs to be fused, and then, drag the four feature points $P_1$, $P_2$, $P_3$, and $P_4$ to the positions of the four mapping points $P_1'$, $P_2'$, $P_3'$, and $P_4'$, respectively. In this dragging process, the projected image is deformed so as to attain a converted image.

Particularly, it is possible to respectively drag the four feature points $P_1$, $P_2$, $P_3$, and $P_4$ to the mapping points $P_1'$, $P_2'$, $P_3'$, and $P_4'$, so as to let each feature point superpose on the corresponding mapping point. In this dragging process, it is possible to conduct triangular surface conversion with respect to the projected image (i.e., divide the projected image into multiple triangular surfaces), and then, create, on the basis of the multiple triangular surfaces, a homography matrix between time points before and after being dragged so as to obtain a mapping matrix between the projected image and the converted image, thereby generating the converted image. It is thus clear that the spatial shape of the converted image and the positions of the respective points therein rely on the joint effects of dragging the four feature points $P_1$, $P_2$, $P_3$, and $P_4$.

Figure 9:
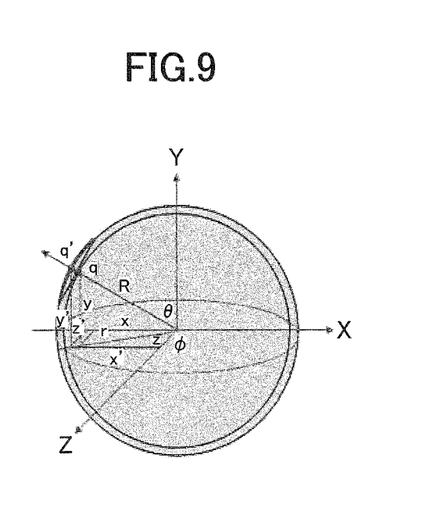
FIG. 9 illustrates a process of mapping non-feature points in the converted image shown in FIG. 8 onto the related spherical image.

FIG. 9 illustrates a process of mapping multiple points except the four feature points in the converted image onto the spherical image.

Since all the four feature points acquired in the converted image presented in FIG. 8 are located on the spherical surface corresponding to the spherical image, the multiple points (i.e., non-feature points) except the four feature points $P_1$, $P_2$, $P_3$, and $P_4$ in the converted image may be mapped onto the spherical image, as shown in FIG. 9.

In particular, it is possible to obtain a straight line passing through the spherical center of the spherical surface corresponding to the spherical image and a non-feature point $q(x_q,y_q,z_q)$ on the converted image, and then, attain an intersection $q'(x_q',y_q',z_q')$ of the straight line and the spherical surface, so as to map the non-feature point q onto the intersection q' and replace the corresponding original point on the spherical image. Since the straight line passing through the spherical center of the spherical surface and the non-feature point q on the converted image usually has two intersections with the spherical surface, it is possible to select the intersection q' for mapping on the grounds of the predetermined location on the spherical surface onto which the two dimensional image needs to be fused.

Here, as shown in FIG. 9, $$\varphi = \tan^{-1}\frac{z_q}{x_q};$$

$$\theta = \tan^{-1}\left(\frac{\sqrt{x_q^2 + z_q^2}}{y_d}\right);$$

$$r_0 = \sqrt{R^2 - y^2}$$

$$x_q' = r \times \cos\varphi;$$

$$y_q' = R \times \cos\theta; \text{ and}$$

$$z_q' = r \times \sin\varphi.$$

After all the non-feature points on the converted image are mapped to the spherical image, and the corresponding points on the spherical image are replaced, the two-dimensional image is fused onto the spherical image is finished. That is, a new spherical image, i.e., a fused spherical image is procured.

Figure 10:
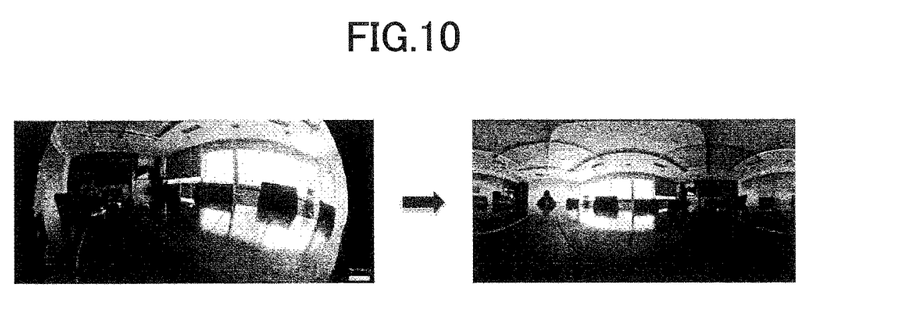
FIG. 10 illustrates a process of performing longitude and latitude based mapping (projection) on a fused spherical image so as to acquire a second planar image.

Finally, it is also possible to carrying out longitude and latitude based mapping (projection) (as shown in FIG. 4) with respect to the fused spherical image so as to attain a second planar image which is also an equirectangular image, as shown in FIG. 10. Here, FIG. 10 illustrates a process of performing longitude and latitude based mapping (projection) on a spherical image after image fusion so as to acquire a second planar image.

Second Embodiment

A three dimensional image fusion device is given in this embodiment.

Figure 11:
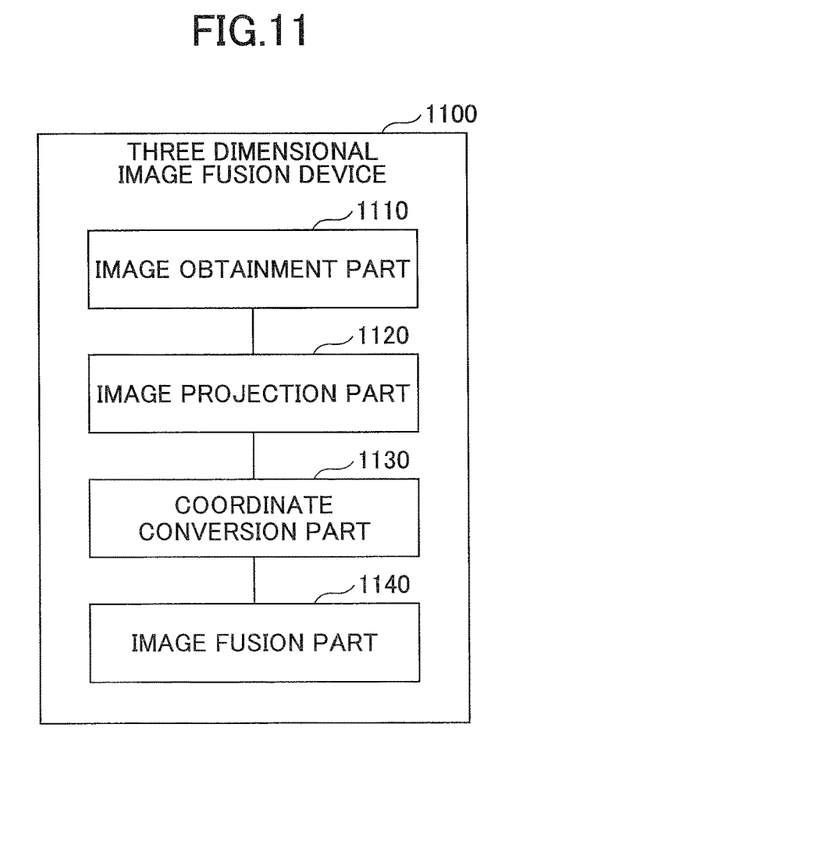
FIG. 11 is a block diagram of a three dimensional image fusion device according to a second embodiment of the present disclosure.

FIG. 11 is a block diagram of a three dimensional image fusion device 1100 according to this embodiment.

As shown in FIG. 11, the three dimensional image fusion device 1100 is inclusive of an image obtainment part 1110, an image projection part 1120, a coordinate conversion part 1130, and an image fusion part 1140. Aside from these parts, the dimensional image fusion device 1100 may also contain other parts, of course. However, since the other parts are not closely relating to the embodiments of the present disclosure, the descriptions about them are omitted here for the sake of convenience.

The image obtainment part 1110 is configured to conduct STEP S201 in FIG. 2, i.e., to obtain a spherical image and a two dimensional image which will be fused onto the spherical image. The spherical image may be generated on the basis of a first planar image which is an equirectangular image.

The image projection part 1120 is configured to perform STEP S202 in FIG. 2, i.e., to project the two dimensional image onto a planar surface predetermined in the spherical coordinate system where the spherical image is located, so as to obtain a projected image. The projected image has a predetermined number of feature points on the spherical surface corresponding to the spherical image.

The coordinate conversion part 1130 is configured to carry out STEP S203 in FIG. 2, i.e., to designate multiple mapping points on the spherical surface corresponding to the spherical image which correspond to the predetermined number of feature points of the projected image, let the predetermined number of feature points superpose on the corresponding mapping points, and conduct spatial coordinate conversion so as to attain a converted image.

The image fusion part 1104 is configured to execute STEP S204 in FIG. 2, i.e., to map multiple points except the predetermined number of feature points on the converted image onto the spherical image according to a predetermined mapping relationship so as to let the two dimensional image be fused on the spherical image. In this way, it is possible to acquire a fused spherical image.

Here it should be noted that since STEPS S201 to S204 of FIG. 2 have been detailed in the first embodiment, the descriptions regarding them are omitted here for the sake of convenience.

Moreover, the three dimensional image fusion device 1100 may further contain an image acquirement part which is not presented in the drawings. The image acquirement part is configured to perform longitude and latitude based mapping (projection) on the fused spherical image so as to procure a second planar image which is also an equirectangular image.

Furthermore, if a user wants to change the location on the spherical image onto which the two dimensional image will be fused (e.g., the location of a display screen in the spherical image) in light of the image fusion process set forth above, it is also possible to use the coordinate conversion part 1103 to determine multiple mapping points on the spherical surface corresponding to the spherical image again and acquire a new converted image, and then, utilize the image fusion part 1104 to map the new converted image onto the spherical image in the same way.

As a result, by making use of the three dimensional image fusion device 1100, it is possible to seamlessly fuse a two dimensional image onto a spherical image, i.e., there are not any discontinuous regions or gaps on the fused boundaries in the fused spherical image, so that a satisfied image fusion result may be acquired. In addition, the process of this type of image fusion is simple, the practicality of this kind of image fusion is strong, and the requirements of different visual angles and fusion locations can be met.

Third Embodiment

In this embodiment, another three dimensional image fusion device is provided.

Figure 12:
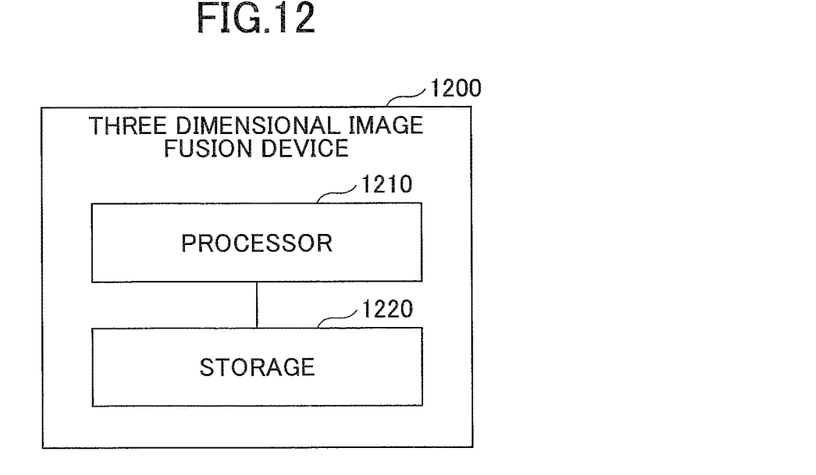
FIG. 12 is a block diagram of another three dimensional image fusion device according to a third embodiment of the present disclosure.

FIG. 12 is a block diagram of a three dimensional image fusion device 1200 according to this embodiment.

Here it should be noted that the three dimensional image fusion device 1200 may be a computer or server.

As presented in FIG. 12, the three dimensional image fusion device 1200 contains at least one processor 1210 and a storage 1220. Of course, it is also possible to include other elements such as a panoramic camera and an output unit (not shown in the drawings) for good measure. These kinds of elements may be connected to each other by way of a bus system, for example.

The storage 1220 is configured to store computer-executable instructions (i.e. an application program) for execution by the processor 1210 and intermediate data during a calculation process of the processor 1210. The computer-executable instructions, when executed, may cause the processor 1210 to carry out the three dimensional image fusion method according to the first embodiment.

As a result, by utilizing the three dimensional image fusion device 1200, it is possible to seamlessly fuse a two dimensional image onto a spherical image, i.e., there are not any discontinuous regions or gaps on the fused boundaries in the fused spherical image, so that a satisfied image fusion result may be acquired. In addition, the process of this kind of image fusion is simple, the practicality of this type of image fusion is strong, and the requirements of different visual angles and image fusion locations can be met.

Here it should be noted that the embodiments of the present disclosure may be implemented in any convenient form, for example, using dedicated hardware or a mixture of dedicated hardware and software. The embodiments of the present disclosure may be implemented as computer software executed by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Since the embodiments of the present disclosure can be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 201710099062.6 filed on Feb. 23, 2017, the entire contents of which are hereby incorporated by reference.

What is claimed is:

1. A three dimensional image fusion method comprising:
obtaining a spherical image and a two dimensional image to be fused onto the spherical image;
projecting the two dimensional image onto a planar surface predetermined in a spherical coordinate system where the spherical image is located, so as to acquire a projected image which has a predetermined number of feature points on a spherical surface corresponding to the spherical image;
determining multiple mapping points on the spherical surface which correspond to the predetermined number of feature points, letting the predetermined number of feature points superpose on the multiple mapping points, respectively, and carrying out spatial coordinate conversion, so as to attain a converted image; and
mapping multiple points except the predetermined number of feature points in the converted image onto the spherical image based on a predetermined mapping relationship so as to fuse the two dimensional image onto the spherical image, so that a fused spherical image is procured.

2. The three dimensional image fusion method according to claim 1, wherein, the obtaining a spherical image includes
acquiring a first planar image and performing longitude and latitude based projection on the first planar image, so as to obtain the spherical image.

3. The three dimensional image fusion method according to claim 1, wherein, the projecting the two dimensional image onto a planar surface predetermined in a spherical coordinate system where the spherical image is located, so as to acquire a projected image includes
obtaining a point on the spherical surface corresponding to the spherical image;
attaining a bottom surface of a spherical segment, a distance from the bottom surface to the point on the spherical surface corresponding to the spherical image being a predetermined one; and
projecting the two dimensional image onto the bottom surface of the spherical segment so as to acquire the projected image which is inscribed in the bottom surface of the spherical segment.

4. The three dimensional image fusion method according to claim 3, wherein, the projecting the two dimensional image onto the bottom surface of the spherical segment includes
projecting the two dimensional image on the bottom surface of the spherical segment in linear and equal proportion.

5. The three dimensional image fusion method according to claim 1, wherein,
the predetermined number of feature points that the projected image has are edge points and/or corner points of the projected image.

6. The three dimensional image fusion method according to claim 1, wherein,
the two dimensional image has a regular polygonal shape.

7. The three dimensional image fusion method according to claim 1, wherein, the letting the predetermined number of feature points superpose on the multiple mapping points, respectively, and carrying out spatial coordinate conversion, so as to attain a converted image includes
creating a homography matrix based on positions of the predetermined number of feature points and the multiple mapping points, and attaining the converted image based on the two dimensional image and the homography matrix.

8. The three dimensional image fusion method according to claim 1, wherein, the mapping multiple points except the predetermined number of feature points in the converted image onto the spherical image based on a predetermined mapping relationship includes
acquiring an intersection of the spherical surface and a straight line which passes through a spherical center of the spherical surface corresponding to the spherical image and each non-feature point on the converted image; and
mapping each non-feature point in the converted image onto the corresponding intersection, and replacing a corresponding original point on the spherical image.

9. The three dimensional image fusion method according to claim 1, further comprising:
carrying out longitude and latitude based projection with respect to the fused spherical image so as to attain a second planar surface.

10. A three dimensional image fusion device comprising:
a processor; and
a storage connected to the processor, storing computer-executable instructions for execution by the processor,
wherein, the computer-executable instructions, when executed, cause the processor to implement the three dimensional image fusion method according to claim 1.

11. A non-transitory computer-readable medium having computer-executable instructions for execution by a processing system, wherein, the computer-executable instructions, when executed, cause the processing system to carry out the three dimensional image fusion method according to claim 1.

12. A three dimensional image fusion device comprising:
an image obtaining part configured to obtain a spherical image and a two dimensional image to be fused onto the spherical image;
an image projection part configured to project the two dimensional image onto a planar surface predetermined in a spherical coordinate system where the spherical image is located, so as to acquire a projected image which has a predetermined number of feature points on a spherical surface corresponding to the spherical image;
a coordinate conversion part configured to determine multiple mapping points on the spherical surface which correspond to the predetermined number of feature points, let the predetermined number of feature points superpose on the multiple mapping points, respectively, and carrying out spatial coordinate conversion, so as to attain a converted image; and
an image fusion part configured to map multiple points except the predetermined number of feature points in the converted image onto the spherical image based on a predetermined mapping relationship so as to fuse the two dimensional image onto the spherical image, so that a fused spherical image is generated.

* * * * *